United States Patent
Neill et al.

(10) Patent No.: US 9,783,998 B2
(45) Date of Patent: *Oct. 10, 2017

(54) NONWOVEN JOINT TAPE HAVING LOW MOISTURE EXPANSION PROPERTIES AND METHOD FOR USING SAME

(71) Applicant: United States Gypsum Company, Chicago, IL (US)

(72) Inventors: Paul H. Neill, Oak Brook, IL (US); Salvatore C. Immordino, Trevor, WI (US); Richard B. Stevens, Crystal Lake, IL (US); Charles J. Miller, McHenry, IL (US)

(73) Assignee: United States Gypsum Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/165,926

(22) Filed: May 26, 2016

(65) Prior Publication Data

US 2016/0273234 A1    Sep. 22, 2016

Related U.S. Application Data

(63) Continuation of application No. 11/609,704, filed on Dec. 12, 2006, now Pat. No. 9,376,824.

(51) Int. Cl.

| | | |
|---|---|---|
| *E04F 19/06* | (2006.01) | |
| *C09J 7/04* | (2006.01) | |
| *D04H 1/58* | (2012.01) | |
| *D04H 13/00* | (2006.01) | |
| *E04F 21/00* | (2006.01) | |
| *E04F 13/076* | (2006.01) | |
| *D04H 1/4218* | (2012.01) | |
| *D04H 1/425* | (2012.01) | |
| *D04H 1/435* | (2012.01) | |
| *D04H 1/4382* | (2012.01) | |

(52) U.S. Cl.
CPC .............. *E04F 19/062* (2013.01); *C09J 7/04* (2013.01); *D04H 1/425* (2013.01); *D04H 1/4218* (2013.01); *D04H 1/435* (2013.01); *D04H 1/4382* (2013.01); *D04H 1/58* (2013.01); *D04H 13/008* (2013.01); *E04F 13/076* (2013.01); *E04F 21/00* (2013.01); *C09J 2400/263* (2013.01); *Y10T 156/10* (2015.01); *Y10T 442/20* (2015.04); *Y10T 442/2738* (2015.04); *Y10T 442/60* (2015.04)

(58) Field of Classification Search
CPC combination set(s) only.
See application file for complete search history.

(56) References Cited

U.S. PATENT DOCUMENTS

| | | | | |
|---|---|---|---|---|
| 5,635,290 A | * | 6/1997 | Stopper | D04H 1/54 428/157 |
| 6,248,418 B1 | * | 6/2001 | Taguchi | A41B 3/10 2/171 |

FOREIGN PATENT DOCUMENTS

WO    WO2006059699    *  6/2006

* cited by examiner

*Primary Examiner* — Samir Shah
(74) *Attorney, Agent, or Firm* — Leydig, Voit & Mayer, Ltd.; Philip T. Petti; Pradip K. Sahu

(57) ABSTRACT

The invention is directed to a joint tape for finishing a joint between boards comprising a nonwoven substrate that does not swell substantially in the presence of water. The invention further provides a method of finishing a joint between boards comprising (i) applying a joint tape of the invention to a joint between boards by embedding the joint tape in a first coat of joint compound, (ii) applying a second coat of joint compound over the tape, wherein step (ii) is carried out before the joint tape and joint compound applied in step (i) have substantially dried, and optionally (iii) applying a third fill or finish coat of joint compound over the tape, wherein step (iii) is carried out before the joint tape and second coat have substantially dried.

20 Claims, No Drawings

NONWOVEN JOINT TAPE HAVING LOW MOISTURE EXPANSION PROPERTIES AND METHOD FOR USING SAME

CROSS-REFERENCE TO RELATED APPLICATION

This patent application is a continuation of copending of U.S. patent application Ser. No. 11/609,704, filed on Dec. 12, 2006, the entire disclosure of which is expressly incorporated by reference herein.

BACKGROUND OF THE INVENTION

Walls, ceilings, floors, partitions, bathtub surround and the like are commonly constructed from multiple pieces of board (sometimes referred to as "panels"). The board may be composed of any of a variety of materials, including but not limited to, cementitious materials such as, for example, cement or gypsum. Typically, when two pieces of board abut each other in use, a gap or seam referred to as a joint is defined between boards. It is well known to fill and coat the joints with a specially prepared adhesive called "joint compound." Two types of joint compound are known in the art: a setting type and drying type, which is available in a ready-mix form. This process is also used to make repairs of defects, such as uneven surfaces, holes, depressions, gaps, dents, and other imperfections including those around electrical boxes, piping and duct work, as well as corners created by the intersection of drywall boards.

It is well known in the art that finishing a joint between boards using a joint tape typically involves three steps. First a thin layer of joint compound is applied to the boards over the joint, and the tape is embedded into it. This step is commonly referred to as the embedding step. Next, a second coat of joint compound is applied over the embedded joint tape. This step is commonly referred to as the fill step. The second coat of joint compound typically extends approximately two inches beyond the edges of the joint tape. Finally a third coat of joint compound is applied over the first two coats, where the third coat typically extends even further out from the edges of the joint tape. This is commonly referred to as the finish step. Because paper joint tape will swell in the presence of the moisture from the joint compound, the second and third coats of joint compound cannot be applied until the previous coat of joint compound and the joint tape are fully dry, which often takes as much as 24 hours. This means that as many as three days are required to finish a board joint. Where the tape is a self-adhesive tape, only steps (ii) and (iii) are required, and therefore up to two full days are needed to finish a joint.

Joint tape adds strength and crack resistance as well as smooth concealment at flat joints and inside corners. Conventionally, three types of joint tape have been employed: a simple kraft paper strip; a woven glass fiber tape; and a non-woven glass fiber tape. Kraft paper strips and non-woven glass fiber tape are adhered to the surfaces of board such as drywall by a bedding coat of joint compound or they are self-adhered. Woven glass fiber tape is typically of the self adhesive type, but can also be fixed to the wall with staples. Once a paper joint tape has been applied, one must wait as much as a day for the joint compound and tape to be fully dry before the next coat of joint compound can be applied.

Glass fiber tape is nonswellable and resists stretching and wrinkles. However nonwoven glass fiber tapes suffer from low tensile strength and are prone to cracking when used with conventional joint compounds. Woven glass fiber tapes have sufficient tensile strength, but the board joints produced with drying-type joint compound are prone to cracking, and thus woven glass fiber tapes are only recommended for use with setting type compounds.

Accordingly, there remains a need in the art for an improved joint tape that has high strength and reduced expansion due to moisture. In addition, there remains a need for an improved method of finishing joints between pieces of board that reduces or eliminates the need to wait until the joint compound has dried. The invention provides such a joint tape and method. These and other advantages of the invention as well as additional inventive features will be apparent from the description of the invention provided herein.

BRIEF SUMMARY OF THE INVENTION

The invention provides a joint tape for finishing a joint between boards (such as, for example, drywall, cement board, or the like) comprising a nonwoven substrate that does not swell significantly in the presence of water and that has sufficient strength so as to resist tearing and cracking during application. In one embodiment, the joint tape comprises a nonwoven substrate comprising fibers selected from the group consisting of natural pulp fibers, synthetic polymeric fibers, glass fibers, and combinations thereof, wherein the nonwoven substrate preferably has, as determined according to ASTM C474-05:

- a crosswise percent expansion of less than about 1.3%;
- a lengthwise percent expansion of less than about 0.2%; and
- a tensile strength of at least about 15 pounds-force per inch in the cross direction.

The invention further provides a method of finishing a joint between boards comprising the use of the joint tape of the invention. Applicants have surprisingly discovered that using the joint tape of the invention, the time required to finish a joint can be substantially reduced. In particular, a second coat of joint compound can be applied over a first coat without having to wait for the first coat or the joint tape to dry. Accordingly, in another embodiment, the invention provides a method comprising (i) applying a joint tape of the invention to a joint between boards by embedding the tape in a first coat of joint compound, (ii) applying a second, fill coat of joint compound over the tape, and optionally (iii) applying a third, fill or finish coat of joint compound over the tape, wherein step ii and/or iii is carried out before the previous coat and/or joint tape has substantially dried or set.

DETAILED DESCRIPTION OF THE INVENTION

The invention relates to joint tape, methods of finishing joints between boards, and reinforcements for cementitious materials generally. Finishing a board joint, as used herein, refers to applying tape and joint compound to a joint between boards so as to create an assembly of boards that, after finishing, can be further treated such as by applying paint, wallpaper, tile, paneling, and the like. The inventive joint tape can be used with board used in forming walls, ceilings, floors, partitions, bathtub surround, vertical and horizontal shaft walls, stairwells, area separation walls, and the like. For example, the joint tape of the invention can be used with SHEETROCK® drywall products and DUROCK® cement board products, commercially available from United States Gypsum Company as well as competing products, and the like. The board may be composed of any of a variety of materials, including but not limited to, cementitious materials such as, for example, cement or gypsum. The term "drywall" is used illustratively, but as one of ordinary skill will appreciate, includes a variety of products such as wallboard, fiberboard, glass-faced gypsum boards, cement board, and the like. The term "tape" means a strip of material that can be provided, for example, in roll form, which may or may not contain an adhesive backing layer, and which desirably complies with the standards set forth in ASTM C474-05 and C475.

The invention is directed to a joint tape comprising a substrate comprising fibers that are substantially non-swellable in the presence of moisture. In this respect, the present invention is premised, at least in part, on the inventors' surprising and unexpected discovery of a joint tape comprising a substrate having a crosswise percent expansion of less than about 1.3% and a lengthwise percent expansion of less than about 0.2%, as determined according to ASTM 0474-05. For example, in some embodiments, the substrate has a crosswise percent expansion of less than about 1% and a lengthwise percent expansion of less than about 0.15%. Preferably, the substrate has a crosswise percent expansion of less than about 0.8% and a lengthwise percent expansion of less than about 0.1%. In some embodiments, the substrate has a crosswise percent expansion of less than about 1.3% and a lengthwise percent expansion of less than about 0.15%, a crosswise percent expansion of less than about 1.3% and a lengthwise percent expansion of less than about 0.1%, a crosswise percent expansion of less than about 1% and a lengthwise percent expansion of less than about 0.2%, a crosswise percent expansion of less than about 1% and a lengthwise percent expansion of less than about 0.1%, a crosswise percent expansion of less than about 0.8% and a lengthwise percent expansion of less than about 0.2%, or a crosswise percent expansion of less than about 1% and a lengthwise percent expansion of less than about 0.15%.

It is also desirable that the joint tape have sufficient strength to avoid breaking during application to a drywall joint. Accordingly, the joint tape of the invention preferably comprises a substrate having a tensile strength of at least about 15 pounds-force per inch in the cross direction, as determined according to ASTM C474-05. In some embodiments, the substrate has a tensile strength of at least about 18 pounds-force per inch in the cross direction. Preferably the substrate has a tensile strength of at least about 20 pounds-force per inch in the cross direction.

The substrate is a nonwoven substrate. As used herein, the term "nonwoven substrate" refers to a web having a structure of individual fibers or threads which are interlaid, but not in an identifiable manner as in a knitted fabric. Nonwoven webs or fabrics have been formed from many processes, such as, for example, meltblowing processes, spunbonding processes, and bonded carded web processes. The nonwoven substrate can have any suitable pore size which provides for sufficient permeability of the joint compound through the tape to thereby enhancing the bond to joint compound (i.e., at least about 90% bond to joint compound as determined in accordance with ASTM C 474-05) between the tape and the drywall to which it is applied. Desirably the fluid permeability of the nonwoven substrate, measured as air resistance according to TAPPI T-460 (Gurley method), is about 6 seconds or less (e.g., about 5 seconds or less, or about 4 seconds or less). The upper limit on the permeability of the nonwoven substrate is bound by the need for sufficient tensile strength as discussed above.

The nonwoven substrate can comprise any suitable fibers. For example the nonwoven substrate can comprise fibers selected from the group consisting of natural pulp fibers, synthetic polymeric fibers, glass fibers, and combinations thereof. Natural pulp fibers can include wood pulp fibers including softwood and hardwood pulp fibers, straw fibers, plant and grass pulp fibers such as hemp, jute, kenaf, and bamboo pulp fibers, cotton pulp fibers, and the like. In some embodiments the natural pulp fibers are wood pulp fibers, such as those used in paper making. Synthetic polymeric fibers can include fibers comprising polymers selected from the group consisting of polyester, polyethylene, polypropylene, nylon, polyacetate, polyacrylic acid, polystyrene, polyvinyl acetate, rayon, polyvinylchloride, copolymers thereof and combinations thereof. In some embodiments the synthetic polymeric fibers comprise polyester, polyethylene, polypropylene, or a combination thereof.

The fibers used to form the nonwoven substrate used in the inventive joint tape are selected so as to satisfy the requirement for percent expansion and tensile strength described above. Typically the nonwoven substrate comprises a high percentage of synthetic polymeric fibers, preferably polyester fibers. In addition, the nonwoven substrate can comprise natural pulp fibers, preferably wood pulp fibers, and/or glass fibers. In one embodiment, the nonwoven substrate comprises synthetic polymeric fibers, wood pulp fibers, and glass fibers. In some embodiments, the nonwoven substrate comprises at least about 30 wt. % or more synthetic polymeric fibers, less than about 1 wt. % natural pulp fibers, and/or less than about 50 wt. % glass fibers, wherein the weight is based on the total weight of the nonwoven substrate.

The nonwoven substrate used in the joint tape of the invention optionally further comprises a binder. Binders typically are added during formation of a nonwoven substrate to promote adherence of the fibers and to improve strength of the resulting substrate. The binder can be any suitable binder, many of which are known in the art. The binder can be a polymer binder, for example a polymer formed from vinyl acetate, vinyl alcohol, vinyl chloride, acrylic acid, ethyl vinyl acetate, and ethyl vinyl chloride, starch, and combinations thereof.

The binder also can be a starch or starch derivative. Suitable starches include corn, waxy corn, milo, white milo, wheat, potato and tapioca. Suitable starch derivatives include hydroxyethyl starch ether, starch acetate, starch phosphate, starch maleate, starch propionamide, cationic starch, oxidized starch and cyanoethyl starch and in particular, hydroyethylated potato starch, cationic potato starch, acid modified corn starch, hydroxyethylated corn starch, oxidized corn starch and mixtures thereof. Also included are cross-linked starches and starch conversion products, such as dextrins (e.g., white dextrins, canary dextrins and British gums), maltodextrins, thermochemically converted starches, and oxidized starches.

The binder preferably is selected from the group consisting of polyvinyl alcohol, polyvinyl acetate, polyethylene vinyl acetate, polyvinylchloride, cross-linked starch, and combinations thereof. In some embodiments, the binder desirably is a cross-linked starch. In other embodiments, the binder desirably is polyvinyl alcohol and/or polyvinyl acetate. In yet other embodiments, the binder desirably is a mixture of a cross-linked starch and polyvinyl alcohol and/or polyvinyl acetate.

The nonwoven substrate used in the inventive joint tape optionally is coated at least in part with a bond enhancing agent. The bond enhancing agent is any agent that improves the bond between the joint tape and the joint compound once the tape is applied to the wall and subsequent adhesion of the joint compound-permeated tape to the board (e.g., drywall) surface. For example, the bond enhancing agent can be selected from the group consisting of polymers formed from vinyl acetate, vinyl alcohol, vinyl chloride, acrylic acid, ethyl vinyl acetate, and ethyl vinyl chloride, starch, and combinations thereof. Preferably the bond enhancing agent is selected from the group consisting of polyvinyl acetate, polyvinyl alcohol, and combinations thereof.

In some embodiments, the nonwoven substrate used in the inventive joint tape optionally comprises an adhesive on at least a back side of the nonwoven substrate. The adhesive can be used in place of, or in addition to, a bond enhancing agent. The adhesive typically is a pressure-sensitive adhesive, many of which are known in the art. As used herein, "pressure sensitive" refers to any releasable adhesive or releasable tenacious means. Suitable adhesives include acrylate adhesives, e.g., isooctyl acrylate and acrylic acid copolymer, or vinyl acetate-2 ethyl hexyl acrylate copolymer which can be combined with tackifiers. Alternatively, the adhesive may comprise the rapid setting thermoplastic "hot melt" adhesives.

In other embodiments it is desirable that the nonwoven substrate is lightly sanded before application. Light sanding of the surface can improve the bond of the tape to the joint compound during application and subsequent adhesion to the drywall surface. Sanding can be used alone or in combination with a bond enhancing agent and/or adhesive.

The joint tape of the invention can have any suitable thickness. According to ASTM C474-05, joint tapes suitable for use in the industry should have a thickness of about 0.012 inches or less. In some embodiments the joint tape of the invention has a thickness of about 0.01 inches or less, or about 0.008 inches or less. Preferably the joint tape of the invention has a thickness of about 0.007 inches or less, about 0.006 inches or less, about 0.005 inches or less, or about 0.004 inches or less.

The joint tape of any of the embodiments of the invention can further comprise any other suitable additives, such as dyes or pigments, flame retardants, and identification tags, many of which are known in the art. In addition, the joint tape can be pre-creased or scored through the middle to facilitate application to interior angles.

The joint tape of the invention desirably is used to finish joints between boards. One advantage of the joint tape of the invention is that the nonwoven substrate has low percent expansion in the presence of moisture. This feature is particularly desirable in the context of finishing joints between boards because application of the inventive joint tape does not require one applying the tape to wait until the joint compound and tape have dried before another coat of joint compound can be applied.

Accordingly, the joint tape in accordance with any embodiment of the invention desirably is used in a method of finishing a drywall joint. In one embodiment, the method comprises (i) embedding the joint tape in a first coat of joint compound over the joint between boards, (ii) applying a second, fill coat of joint compound to the joint tape, and optionally (iii) applying a third, fill or finish coat of joint compound over the tape, wherein step (ii) and/or (iii) is carried out before the previous coat has substantially dried. The method optionally further comprises (iv) applying a fourth fill or finish coat of joint compound over the tape and, optionally, (v) applying a fifth finish coat of joint compound over the tape, wherein steps (iv) and (v) are carried out before the preceding coat has substantially dried. The term "embed" as used herein means to set or place the tape at least partially onto or into the joint compound. The joint tape can be fully or partially embedded in the joint compound.

In another embodiment, the method comprises (i) applying a joint tape in accordance with any embodiments of the invention to a joint between boards using an adhesive such as a pressure sensitive adhesive, (ii) applying a first, fill coat of joint compound to the joint tape, and optionally (iii) applying a second, fill or finish coat of joint compound over the tape, wherein step (iii) is carried out before the first coat has substantially dried. The method optionally further comprises applying a third, fourth, or even fifth fill or finish coat of joint compound over the tape, wherein each additional coat is applied before the previously applied coat has substantially dried.

The term "substantially dried" as used herein refers to the point at which the water present in a joint compound that has been applied over a paper joint tape has sufficiently evaporated such that any swelling of the tape that occurred due to the presence of the moisture has substantially or completely abated. In the inventive method, a subsequent coat of joint compound can be applied before any of the water present in the joint compound has been removed, e.g., by evaporation. Typically a second or subsequent coat of joint compound can be applied immediately, such as within about 30 minutes, within about 1 hour, or within about 3 hours.

The following examples further illustrate the invention but, of course, should not be construed as in any way limiting its scope.

EXAMPLE

This example illustrate that nonswellable joint tapes in accordance with the invention have tensile strengths and bonds to joint compound that are comparable to conventional paper joint tapes.

A nonwoven material comprising a blend of polyester, glass, and wood pulp fibers (Ahlstrom 7136) was cut into two 3' strips to mimic standard paper joint tape dimensions. One strip was lightly sanded on one side using 120 grit sandpaper. The unsanded nonwoven strip had a thickness of 9.5±0.3 mil (242±7 micron). The sanded nonwoven strip had a thickness of 8.2±0.2 mil (207±4 micron).

In addition, two conventional paper joint tapes (Sheetrock™ brand tape) were obtained for comparative purposes. One of the paper joint tapes was lightly sanded on one side using 120 grit sandpaper. The unsanded paper strip had a thickness of 8.5±0.3 mil (216±7 micron). The sanded paper strip had a thickness of 8.5±0.1 mil (217±2 micron).

The tensile strength for each of the four strips was determined. The tensile strength in the cross direction was determined following ASTM C 474 (½" gauge, 0.66 in/min, 73° F., 50% RH) for the sanded materials, and following TAPPI T 494om (7" gauge, 1 in/min, 73° F. 50% RH) for the unsanded materials. The tensile strength in the machine direction was determined following TAPPI T 494om (7" gauge, 1 in/min, 73° F., 50% RH) for both the sanded and unsanded materials. The tensile strengths are reported in Table 1.

TABLE 1

| Material | Cross Direction | Machine Direction |
| --- | --- | --- |
| Ahlstrom 7136 - unsanded | 29.7 ± 0.7 lb/in (5200 ± 123 N/m) | 44.1 ± 1.1 lb/in (7719 ± 192 N/m) |

TABLE 1-continued

| Material | Cross Direction | Machine Direction |
| --- | --- | --- |
| Ahlstrom 7136 - sanded | 14.6 ± 1.3 lb/in (2564 ± 119 N/m) | 26.6 ± 3.5 lb/in (4651 ± 618 N/m) |
| Paper - unsanded | 30.1 ± 0.1 lb/in (5274 ± 23 N/m) | 52.7 ± 0.3 lb/in (9225 ± 50 N/m) |
| Paper - sanded | 31.1 ± 1.1 lb/in (5441 ± 186 N/m) | 41.5 ± 1.5 lb/in (7270 ± 270 N/m) |

Each strip of nonwoven material was then applied to a wallboard (drywall) panel joint with SHEETROCK™ brand setting type joint compound. The resulting bond of the strip to the wallboard joint compound and drywall surface was determined according to ASTM C474-05 under a variety of conditions. The ASTM bond to joint compound for each material under a variety of conditions are provided in Table 2.

TABLE 2

| Conditions | Ahlstrom 7136 | Paper |
| --- | --- | --- |
| Room temperature | 100% | 100% |
| Oven (110° F.) | 100% | 100% |
| 85° F./10% R.H. | 100% | 100% |
| 75° F./50% R.H. | 83%-100% | 90%-100% |
| 40° F./80% R.H. | 0%-20% | 56%-72% |
| Recovery 75° F./50% R.H. | 100% | 100% |

These results demonstrate that nonwoven, nonswellable materials of the invention can be used as joint tapes without sacrificing tensile strength and bond to joint compound and drywall surface.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A joint tape, comprising a nonwoven substrate comprising natural pulp fibers and at least about 30 wt. % or more synthetic polymeric fibers,
   wherein the synthetic polymeric fibers are selected from the group consisting of polyester, polyethylene, polypropylene, nylon, polyacetate, polyacrylic, polystyrene, polyvinyl acetate, rayon, polyvinylchloride, copolymers thereof and combinations thereof,
   wherein the natural pulp fibers are wood pulp fibers,
   wherein the nonwoven substrate comprises less than about 1 wt. % but greater than 0 wt. % natural pulp fibers,
   wherein the nonwoven substrate has a thickness of about 0.012 inches or less, and has as determined according to ASTM C474-05:
   (a) a crosswise percent expansion of less than about 1.3%;
   (b) a lengthwise percent expansion of less than about 0.2%; and
   (c) a tensile strength of at least about 15 pounds-force per inch in the cross direction, and
   wherein the joint tape has a fluid permeability measured as air resistance according to TAPPI T-460 of about 6 seconds or less.

2. The joint tape of claim 1, wherein the nonwoven substrate has as determined according to ASTM C474-05:
   (a) a crosswise percent expansion of less than about 0.8%;
   (b) a lengthwise percent expansion of less than about 0.1%; and
   (c) a tensile strength of at least about 20 pounds-force per inch in the cross direction.

3. The joint tape of claim 2, wherein the nonwoven substrate comprises a binder.

4. The joint tape of claim 1, wherein the fibers comprise polyester fibers.

5. The joint tape of claim 4, wherein the nonwoven substrate comprises binder selected from the group consisting of polyvinyl alcohol, polyvinyl acetate, polyethylene vinyl acetate, polyvinylchloride, starch, cross-linked starch, and combinations thereof.

6. The joint tape of claim 1, wherein the nonwoven substrate comprises a binder.

7. The joint tape of claim 6, wherein the nonwoven substrate is coated at least in part with a bond enhancing agent.

8. The joint tape of claim 6, wherein the binder is selected from the group consisting of polyvinyl alcohol, polyvinyl acetate, polyethylene vinyl acetate, polyvinylchloride, starch, cross-linked starch, and combinations thereof.

9. The joint tape of claim 8, wherein the nonwoven substrate is coated at least in part with a bond enhancing agent selected from the group consisting of polymers formed from vinyl acetate, vinyl alcohol, vinyl chloride, acrylic acid, ethyl vinyl acetate, and ethyl vinyl chloride, starch, and combinations thereof.

10. The joint tape of claim 8, wherein the nonwoven substrate has as determined according to ASTM C474-05:
(a) a crosswise percent expansion of less than 0.8%;
(b) a lengthwise percent expansion of less than 0.1%; and
(c) a tensile strength of at least 20 pounds-force per inch in the cross direction.

11. The joint tape of claim 1, wherein the nonwoven substrate is coated at least in part with a bond enhancing agent.

12. The joint tape of claim 11, wherein the bond enhancing agent is selected from the group consisting of polymers formed from vinyl acetate, vinyl alcohol, vinyl chloride, acrylic acid, ethyl vinyl acetate, and ethyl vinyl chloride, starch, and combinations thereof.

13. The joint tape of claim 1, wherein the wood pulp fibers are selected from the group consisting of softwood pulp fibers, hardwood pulp fibers, straw fibers, plant pulp fibers, grass pulp fibers, cotton pulp fibers, and combinations thereof.

14. A method of finishing a joint between boards, comprising:
(i) applying a joint tape comprising a nonwoven substrate comprising less than about 1 wt. % but greater than 0 wt. % wood pulp fibers and at least about 30 wt. % synthetic polymeric fibers to the joint between boards by at least partially embedding the joint tape in a first coat of joint compound, wherein the nonwoven substrate has a thickness of about 0.012 inches or less and has as determined according to ASTM C474-05 a crosswise percent expansion of less than 1.3%, a lengthwise percent expansion of less than 0.2%; a tensile strength of at least 15 pounds-force per inch in the cross direction, and wherein the nonwoven substrate has a fluid permeability measured as air resistance according to TAPPI T-460 of 6 seconds or less, the synthetic polymeric fibers selected from the group consisting of polyester, polyethylene, polypropylene, nylon, polyacetate, polyacrylic, polystyrene, polyvinyl acetate, rayon, polyvinylchloride, copolymers thereof and combinations thereof; and
(ii) applying a second coat of joint compound over the tape, wherein step (ii) is carried out before the first coat of joint compound applied in (i) has substantially dried;
wherein the method optionally comprises (iii) applying a third coat of joint compound over the tape, wherein step (iii) is carried out before the second coat has substantially dried;
and wherein the nonwoven substrate optionally comprises an adhesive on at least a back side of the nonwoven substrate.

15. The method of claim 14, wherein the nonwoven substrate includes an adhesive on at least a back side of the nonwoven substrate.

16. The method of claim 15, wherein the nonwoven substrate comprises a binder selected from the group consisting of polyvinyl alcohol, polyvinyl acetate, polyethylene vinyl acetate, polyvinylchloride, starch, cross-linked starch, and combinations thereof; and the nonwoven substrate is coated at least in part with a bond enhancing agent selected from the group consisting of polymers formed from vinyl acetate, vinyl alcohol, vinyl chloride, acrylic acid, ethyl vinyl acetate, and ethyl vinyl chloride, starch, and combinations thereof.

17. The method of claim 14, wherein the nonwoven substrate comprises a binder selected from the group consisting of polyvinyl alcohol, polyvinyl acetate, polyethylene vinyl acetate, polyvinylchloride, starch, cross-linked starch, and combinations thereof.

18. The method of claim 17, wherein the nonwoven substrate is coated at least in part with a bond enhancing agent selected from the group consisting of polymers formed from vinyl acetate, vinyl alcohol, vinyl chloride, acrylic acid, ethyl vinyl acetate, and ethyl vinyl chloride, starch, and combinations thereof.

19. The method of claim 14, wherein the nonwoven substrate is coated at least in part with a bond enhancing agent selected from the group consisting of polymers formed from vinyl acetate, vinyl alcohol, vinyl chloride, acrylic acid, ethyl vinyl acetate, and ethyl vinyl chloride, starch, and combinations thereof.

20. The method of claim 14, wherein the wood pulp fibers are selected from the group consisting of softwood pulp fibers, hardwood pulp fibers, straw fibers, plant pulp fibers, grass pulp fibers, cotton pulp fibers, and combinations thereof.

* * * * *